US009946536B2

(12) United States Patent
Abadi et al.

(10) Patent No.: US 9,946,536 B2
(45) Date of Patent: Apr. 17, 2018

(54) AUTOMATIC REFACTORING OF JAVASCRIPT CODE FOR MULTI-THREAD EXECUTION

(71) Applicant: International Business Machines Corporation, Armonk, NY (US)

(72) Inventors: Aharon Abadi, Petach Tikva (IL); Moria Abadi, Petach Tikva (IL)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 14/957,629

(22) Filed: Dec. 3, 2015

(65) Prior Publication Data

US 2017/0161060 A1    Jun. 8, 2017

(51) Int. Cl.
G06F 9/44 (2006.01)
G06F 9/45 (2006.01)

(52) U.S. Cl.
CPC .............. G06F 8/72 (2013.01); G06F 8/315 (2013.01); G06F 8/433 (2013.01)

(58) Field of Classification Search
CPC ....................................................... G06F 8/72
USPC ......................................................... 717/110
See application file for complete search history.

(56) References Cited

U.S. PATENT DOCUMENTS

| 6,687,779 | B1 * | 2/2004 | Sturm ................ G06F 13/4045 710/305 |
| 8,347,272 | B2 | 1/2013 | Sugawara et al. |
| 8,689,096 | B2 * | 4/2014 | Bross .................... G06Q 30/06 715/221 |
| 8,689,191 | B2 | 4/2014 | Dolby et al. |
| 8,910,137 | B2 | 12/2014 | Agarwal et al. |
| 8,949,809 | B2 | 2/2015 | Varma et al. |
| 2007/0180441 | A1 * | 8/2007 | Ding ........................ G06F 8/71 717/163 |

(Continued)

OTHER PUBLICATIONS

Danny Dig et al., "Refactoring Sequential Java Code for Concurrency via Concurrent Libraries", ICSE '09 Proceedings of the 31st International Conference on Software Engineering, pp. 397-407 ,IEEE Computer Society Washington, DC, USA © 2009.

*Primary Examiner* — Li B Zhen
*Assistant Examiner* — Bradford Wheaton

(57) ABSTRACT

Computer implemented method of refactoring JavaScript code for multi-threading concurrent execution, comprising:
1) Designating a source code which includes background code entries indicated by a user as executed in background.
2) Analyzing the source code entries to create a dependency record.
3) Creating a background process comprising the background code entries and removing code entries which read or write from DOM(s).
4) Creating a handler code comprising the write code entries.
5) Creating main code which includes:
   (a) Remaining code entries not included in the background process and the handler code.
   (b) Process initiation code initiating the background process. The process initiation code is placed at a process initiation point identified based on the dependency record which follows the read code entries in the source code execution path and precedes the write code entries.
6) Outputting refactored code file(s) which include the background process, handler code and main code.

20 Claims, 2 Drawing Sheets

(56) References Cited

U.S. PATENT DOCUMENTS

Figure 1:
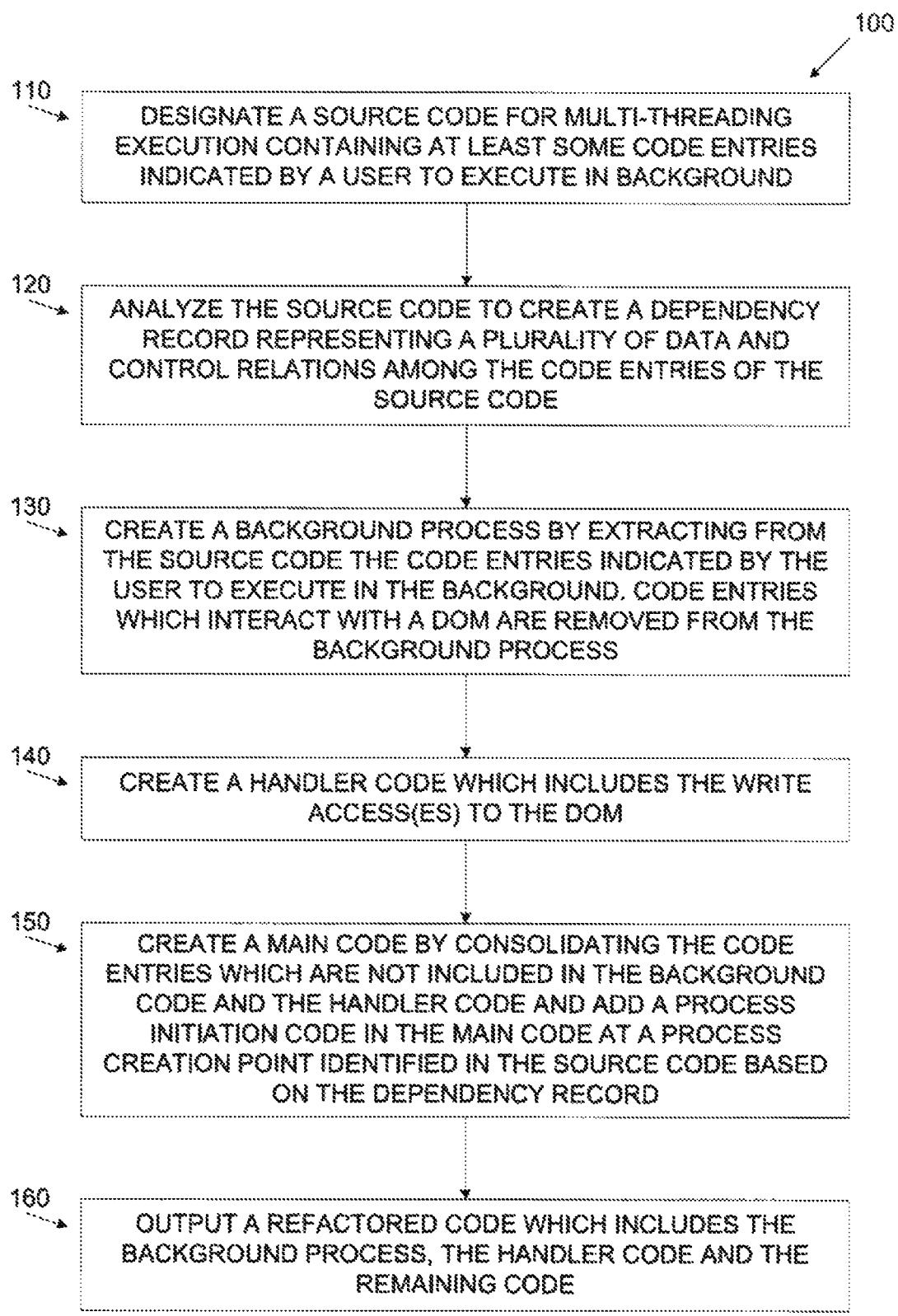

| | | | |
|---|---|---|---|
| 2010/0058293 A1* | 3/2010 | Dunagan | G06F 9/443 717/116 |
| 2011/0202907 A1 | 8/2011 | Dice et al. | |
| 2013/0211770 A1* | 8/2013 | Dresler | G01R 31/31907 702/123 |
| 2014/0359571 A1* | 12/2014 | Sasikumar | G06F 8/35 717/110 |

* cited by examiner

AUTOMATIC REFACTORING OF JAVASCRIPT CODE FOR MULTI-THREAD EXECUTION

FIELD AND BACKGROUND OF THE INVENTION

The present invention, in some embodiments thereof, relates to refactoring source JavaScript code for multi-threading execution, and, more specifically, but not exclusively, to refactoring JavaScript code for multi-threading execution by creating one or more background processes.

Multi-threading has become a common practice for many application and/or software implementations in order to take advantage of multi-threading capabilities of modern processing and more specifically of multi-core processing devices, products, systems and/or platforms. Multi-threading allows two or more threads (smallest independent software code entities) to be executed in parallel to avoid blocking each other with respect to hardware resources such as, for example, processing resources, memory resources, storage resources and/or communication resources.

Multi-threading may however present problems during runtime of the software product(s) and/or application(s) as well as during the software development phase. Software entity threads may interact with one another, conflict with each other and/or block each other. Developing software for multi-threading execution presents a major challenge for software development in general and the challenge may be even more demanding for dynamic software implementations such as, for example, JavaScript.

SUMMARY OF THE INVENTION

According to some embodiments of the present invention there are provided methods and systems for refactoring JavaScript code for multi-threading concurrent execution, comprising of:
  Designating a source code for multi-threading execution. The source code contains one or more background code entries of a plurality of code entries indicated by a user as executed in background. The source code may be a JavaScript source code.
  Analyzing the plurality of code entries to create a dependency record for the source code. The dependency record represents a plurality of relations among the plurality of code entries. Each one of said plurality of relations is a member selected from a group consisting of: a data relation and a control relation.
  Creating a background process comprising the one or more background code entries by removing one or more interacting code entry which interact with one or more document object modules (DOM) from the background process. The interacting code entries include read and/or write code entries. The background process may be added with one or more startup code entries.
  Creating a handler code comprising the write code entries.
  Creating a main code which includes:
    A plurality of remaining code entries from the source code which are not included in the background process and the handler code.
    A process initiation code configured for initiating the background process by the main code at a process initiation point which is identified based on the dependency record. The process initiation point follows the read code entries in an execution path of the source code and precedes the write code entries.
  Outputting one or more refactored code files which include the background process, the handler code and the main code.

The background process may be executed by a different thread of two or more of a plurality of threads executing the source code. The different thread is different from a thread executing the main code.

The background process may receive one or more missing data items as parameter(s) from the main code. The one or more missing data items are retrieved from the DOM(s) by the read code entries.

The background process may be initiated through a message added to the main code at the process initiation point. The message includes one or more data items written to the DOM(s) by the writing code entries.

The background process, handler code and/or main code may be extended with one or more missing control code entries to become executable code entities in case they are not an executable code entity.

Optionally, one or more of a plurality of error handling code entries are extracted from the background process to create an error code. The error code may be included in the process initiation code. The error code may be extended with one or more missing control code entries to become an executable code entity in case it is not an executable code entity.

Optionally the dependency record is a dependency graph crated by a code static analysis.

Optionally, additional one or more background processes are created for the source code. The user indicates one or more additional background code entries associated with each of the additional background process.

According to some embodiments of the present invention there is provided a system for refactoring software code refactoring JavaScript code for multi-threading concurrent execution. The system comprises an interface for communicating with a user, a program store storing a code and one or more processors coupled to the first interface and the program store for executing the stored code which comprises:
  Code instructions to designate a source code for multi-threading execution. The source code contains one or more background code entries of a plurality of code entries indicated by a user as executed in background. The source code may be a JavaScript source code.
  Code instructions to analyze the plurality of code entries to create a dependency record for the source code. The dependency record represents a plurality of relations among the plurality of code entries. Each one of said plurality of relations is a member selected from a group consisting of: a data relation and a control relation.
  Code instructions to create a background process comprising the one or more background code entries by removing one or more interacting code entry which interact with one or more document object modules (DOM) from the background process. The interacting code entries include read and/or write code entries. The background process may be added with one or more startup code entries.
  Code instructions to create a handler code comprising the write code entries.
  Code instructions to create a main code which includes:
    A plurality of remaining code entries from the source code which are not included in the background process and the handler code.
    A process initiation code configured for initiating the background process by the main code at a process initiation point which is identified based on the dependency record. The process initiation point follows the read code entries in an execution path of the source code and precedes the write code entries.

Code instructions to output one or more refactored code files which include the background process, the handler code and the main code.

According to some embodiments of the present invention there is provided a computer program product for refactoring JavaScript code for multi-threading concurrent execution, comprising a non-transitory computer readable storage medium and a plurality of program instructions executed by one or more processors from the non-transitory computer readable storage medium. The program instructions comprising:

First program instructions to designate a source code for multi-threading execution. The source code contains one or more background code entries of a plurality of code entries indicated by a user as executed in background.

Second program instructions to analyze the plurality of code entries to create a dependency record for the source code. The dependency record represents a plurality of relations among the plurality of code entries. Each one of said plurality of relations is a member selected from a group consisting of: a data relation and a control relation.

Third program instructions to create a background process comprising the one or more background code entries by removing one or more interacting code entry which interact with one or more document object modules (DOM) from the background process. The interacting code entries include read and/or write code entries. The background process may be added with one or more startup code entries.

Fourth program instructions to create a handler code comprising the write code entries.

Fifth program instructions to create a main code which includes:

A plurality of remaining code entries from the source code which are not included in the background process and the handler code.

A process initiation code configured for initiating the background process by the main code at a process initiation point which is identified based on the dependency record. The process initiation point follows the read code entries in an execution path of the source code and precedes the write code entries.

Sixth program instructions to output one or more refactored code files which include the background process, the handler code and the main code.

The background process may receive one or more missing data items as parameter(s) from the main code. The one or more missing data items are retrieved from the DOM(s) by the read code entries.

The background process may be initiated through a message added to the main code at the process initiation point. The message includes one or more data items written to the DOM(s) by the writing code entries.

The background process, handler code and/or main code may be extended with one or more missing control code entries to become executable code entities in case they are not an executable code entity.

Optionally, one or more of a plurality of error handling code entries are extracted from the background process to create an error code. The error code may be included in the process initiation code. The error code may be extended with one or more missing control code entries to become an executable code entity in case it is not an executable code entity.

Optionally, additional one or more background processes are created for the source code. The user indicates one or more additional background code entries associated with each of the additional background process.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 2:
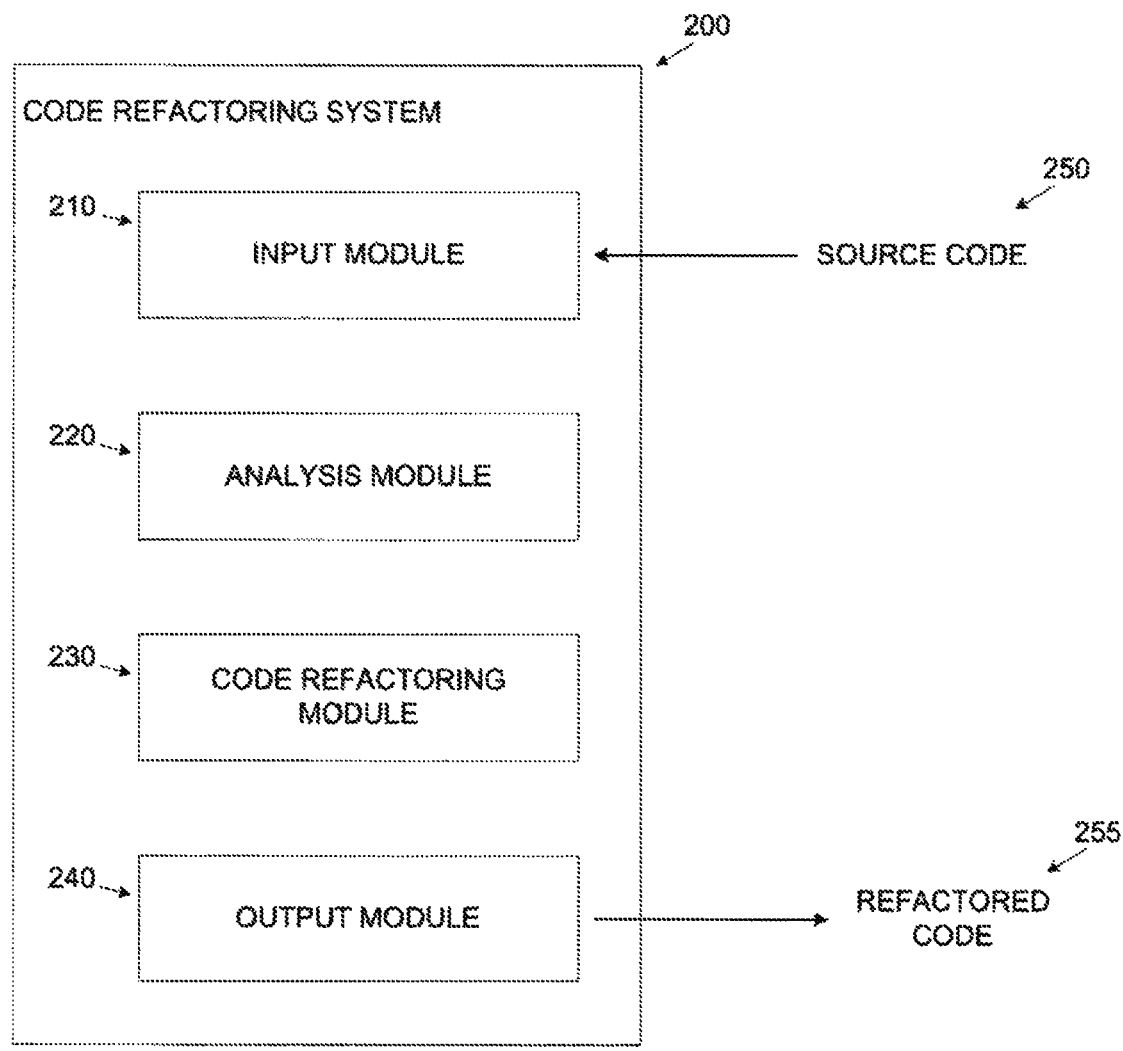

In the drawings:

FIG. 1 is a flowchart of an exemplary process for refactoring source code for multi-threading execution, according to some embodiments of the present invention; and FIG. 2 is a schematic illustration of an exemplary system for refactoring source code for multi-threading execution, according to some embodiments of the present invention.

DESCRIPTION OF SPECIFIC EMBODIMENTS OF THE INVENTION

The present invention, in some embodiments thereof, relates to refactoring source JavaScript code for multi-threading execution, and, more specifically, but not exclusively, to refactoring JavaScript code for multi-threading execution by creating one or more background processes.

According to some embodiments of the present invention, there are provided systems and methods for refactoring a source code and specifically JavaScript code to enable multi-threading execution of the JavaScript code on one or more hardware platforms which supports multi-threading processing. The source code may be analyzed and split to two or more independent processes to allow each of the independent processes to execute in the background and/or by a different thread than the one or more threads executing the main source code.

Executing a source code and specifically a JavaScript code may present and/or encounter execution scenario(s) in which the source code main execution path is blocked, paused and/or stalled while one or more operations included in the source code are executed.

It is possible to avoid blocking the main execution path of the source code by taking advantage of multi-threading execution for concurrent processing supported by a plurality of hardware platforms, for example, a computer, a laptop, a tablet, a mobile device and/or any device based on one or more multi-threading processors.

The source code, for example, code, JavaScript code, abstract syntax tree (AST), code abstraction, code extensible markup language (XML) representation, JavaScript code and/or any software code abstraction and/or representation technique may be received for refactoring from one or more users (programmers) using a development platform, for example, an integrated development environment (IDE) presenting a graphical user interface (GUI) and the likes. The IDE may include a code refactoring software tool which performs the refactoring of the source code to split it for multi-threading execution. The code refactoring software tool may be integrated in the IDE, provided as an add-on module and/or executed as a standalone program. The IDE and/or the code refactoring software tool may be utilized through a local application and/or IDE executed on a local development machine, for example, a computer, a laptop, a tablet and/or a work station. Optionally, the IDE and/or the code refactoring software tool may be available to the one or more users from a remote location, for example, a software as a service (SAAS), a cloud service, a web browser session and/or an application instance executed locally from a remote server.

The received source code is marked by the one or more users with background code entries which are indicated to be executed in the background concurrently to a main execution path of the source code to avoid blocking the main execution path. The source code is analyzed using to create a dependency record which maps a plurality of relations and/or dependencies among a plurality of code entries along an execution path of the source code. The analysis may be, for example, a static analysis to create a dependency graph. The relations may include data relations and/or control relations with respect to one or more shared data items, for example, variables, objects and/or data items which are shared between two or more of the plurality of code entries.

A new background process is created by extracting from the source code the code entries which are indicated by the user(s) to execute in the background. All interacting code entries which interact with one or more document object modules (DOM) are removed from the background process to break apart the execution path of the background process from the main execution path of the source code. One or more startup code entries may be added to the background process to allow setup, initiation and/or execution of the background process. In case the background process is not executable it may be extended with missing control dependency code to make the background process an executable code entity.

A handler code is created which includes code entries of the interacting code entries which interact with the DOM to write a shared data item to the DOM. In case the handler code is not executable it may be extended with missing control dependency code to make the handler code an executable code entity.

The main code is consolidated to include the code entries of the source code which are not included in the background process and the handler code. A process initiation code is added to the main code which is configured to setup the background process and/or initiate execution of the background process. The process initiation code is inserted in the main code at a process initiation point which is identified according to the generated dependency record. The process initiation point is located in the main execution path so that the process initiation follows one or more of the interacting code entries which read from to the DOM and precedes one or more of the interacting code entries which write to the DOM. In case the main code is not executable it may be extended with missing control dependency code to make the main code an executable code entity.

The main code may transfer one or more parameters to the background code to provide the background process with one or more missing data items which are read from the DOM. The background process may post one or more messages to the main code to provide the main code with one or more data items that are written to the DOM. The message may be used by the main code to initiate the background process in case the source code is, for example, a JavaScript code.

The refactored code may include one or more files which are output to the one or more users using, for example the IDE and/or the GUI.

When executed on the multi-threading platform, the refactored code may take advantage of the multi-threading support to execute the background process in the background and/or on a different thread than the one or more threads which process main execution path of the source code.

Optionally, additional one or more background processes may be created to handle a one or more of a plurality of operations and/or interact with a plurality of DOMs. The operation(s) handled by the background process(es) may include, for example, an interaction with a remote resource, interaction with a user(s), interaction with other process(es) and the likes.

Optionally, error code entries which handle errors along the execution path of the background process are extracted from the background process to create an error code. In case the error code is not executable it may be extended with missing control dependency code to make the error code an executable code entity.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a flowchart of an exemplary process for refactoring source code for multi-threading execution, according to some embodiments of the present invention.

Reference is now made to FIG. 2 which is a schematic illustration of an exemplary system for refactoring source code for multi-threading execution, according to some embodiments of the present invention. A code refactoring system 200 includes an input module 210 which receives a source code 250 from one or more users, an analysis module 220 which analyzes the source code 250, a code refactoring module 230 which refactors the source code 250 and an output module 240 for outputting a refactored code 255 to the user(s). Wherein a module refers to a plurality of program instructions stored in a non-transitory medium and executed by one or more processors and/or one or more cores of one or more processors.

Reference is now made once again to FIG. 1. As shown at 110, a process 100 for refactoring a source code for multi-threading execution starts with receiving from one or more users and/or designating a software source code such as the source code 250. The source code 250 may be received from the user(s) through an input module such as the input module 210. The input module 210 may utilize a development platform, for example, an IDE presenting a UI and the likes. The UI may be implemented through a plurality of human-machine interfaces, for example, text interface, GUI and/or audio interface. Optionally, the input module 210 and/or the system 200 includes a communication module which enables communication with one or more remote processing nodes, for example, a serve and/or a workstation which perform the code refactoring process 100. The user(s) may communicate with the remote processing node(s) through a UI interface, for example a software application, a web browser session and/or a chat session for communicating with the remote processing node(s) performing the code refactoring.

The received source code 250 includes a plurality of code entries in which at least some background code entries are indicated and/or marked by the user(s) to be executed in the background and/or concurrently with the main execution path. The goal of the background execution is to avoid the background code entries execution from blocking the main execution path of the source code 250.

As shown at 120, the source code 250 is analyzed by an analysis module such as the analysis module 220 creates a dependency record, which maps data and/or control dependencies and/or relationships among the plurality of code entries along the execution path of the source code 250. The analysis module 220 may use, for example, a static code analysis to create a dependency graph. Specifically, the dependency record maps dependencies for one or more shared data items available from a plurality of sources, for example, a DOM which may represent one or more of a plurality of objects, for example, a stored object, a memory object, a user input object and/or an object manipulated by another one or more software applications. The dependency record describes the dependencies and/or relationships among the code entries of the source code 250 which include program instructions to interact, for example, use, read, write, set, process, display, transfer and/or require a value(s) of the one or more shared data items. The dependencies describe the location(s) (i.e. code entries) in the execution path where interaction is made with the shared data item(s).

As shown at 130, the source code 250 is refactored by a code refactoring module such as the code refactoring module 230. The code refactoring module 230 extracts the background code entries from the code source to detach the background code from the main source code and create an independent background process which may be executed in the background, concurrently and/or on a different thread than the main execution path of the source code. The code refactoring module 230 extracts from the background process all interacting code entries which include program instructions to interact with the shared data item(s) available from the DOM(s). In case the background process is not executable the code refactoring module 230 may extend the background process with one or more missing control dependency code entries to make the background process an independent executable code entity.

Optionally, the code refactoring module 230 extracts from the background process error code entries which handle errors along the execution path of the background process. The error code entries are grouped to create an error code. The code refactoring module 230 may extend the error code with one or more missing control dependency code entries to make the error code an independent executable code entity. In case the error code is not executable the code refactoring module 230 may extend the error code with one or more missing control dependency code entries to make the error code an independent executable code entity.

As shown at 140, the code refactoring module 230 creates a handler code. The handler code includes one or more interacting code entries removed from the background process in which value(s) are set and/or written for the shared data item(s) in the DOM(s). In case the handler code is not executable the code refactoring module 230 may extend the handler code with one or more missing control dependency code entries to make the handler code an independent executable code entity.

As shown at 150, the code refactoring module 230 consolidates the remaining code entries of the source code which are not included in the background process, the handler code and the error code to create a main code. One or more of the interacting code entries removed from the background process in which value(s) of the shared data item(s) are used and/or read from the DOM(s) are placed back in the main code. The main code essentially constitutes the main execution path of the source code 250.

The code refactoring module 230 adds a process initiation code to the main code to setup and initiate the background process. The process initiation code is added in the main code along the execution at a location which follows execution of the interacting code entries which use and/or read value(s) of the shared data item(s) in the DOM(s) and precedes execution of the interacting code entries which set and/or write value(s) of the shared data item(s) from the DOM(s).

The code refactoring module 230 may modify the background process to be initiated with one or more parameters transferred from the main code. The parameter(s) transferred to the background code may provide the background process with missing shared data item(s) which are read from the DOM(s).

The code refactoring module 230 may include one or more messages posted by the background process to provide the main code with missing shared data item(s) which need to be written to the DOM(s). In case the main code is not executable the code refactoring module 230 may extend the main code with one or more missing control dependency code entries to make the main code an independent executable code entity.

As shown at 160, a refactored code such as the refactored code 255 is outputted to the user(s) through an output module such as the output module 240. The refactored code 255 includes the main code, the background process and the handler code and may be available in one or more code files. The output module 240 may be integrated with the input module 210 utilizing, for example, an IDE presenting a UI.

Optionally, additional one or more background processes may be indicated by the user(s) to be executed concurrently to the main execution path of the source code 250 to handle additional one or more of a plurality of operations, computations and/or interaction with a plurality of DOMs, for example, interaction with a remote resource, interaction with a user(s), interaction with other process(es) and the likes. For each of the background processes a dependency record is created and the code is refactored accordingly using the same code refactoring process 100.

Some embodiments of the present disclosure are provided through examples. However, this invention may be embodied in many different forms and should not be construed as limited to any specific structure or function presented herein. An exemplary application is presented herein, which is executed by, for example, a webpage and/or a remote service provided through, for example, a web browser and/or a chat session. The application may present a user interface (UI) to a user which allows the user to perform one or more of a plurality of interaction operations. Among the plurality of operations, the user may initiate a computation of a value of Pi with a desired accuracy of the computation set by the user.

The accuracy for the computation is dictated by the number of elements included in one of a plurality of infinite series providing an approximation for the value of Pi through convergence of the infinite series elements. An exemplary infinite series for the computation of the value of Pi is provided by the Gregory-Leibniz series presented in equation 1 below.

$$\pi = 4 \times \sum_{n=0}^{\infty} \frac{(-1)^n}{2n+1} \rightarrow \pi = \frac{4}{1} - \frac{4}{3} + \frac{4}{5} - \frac{4}{7} + \frac{4}{9} - \frac{4}{11} + \ldots \quad \text{Equation 1}$$

The accuracy of the computation of Pi is set by the number n of elements to be included in the Gregory-Leibniz series The number of elements in the series may be translated to a number of iterations loop performed in an exemplary code presented in code excerpt 1 below for computing an approximation of the values of Pi.

Code excerpt 1:

```
var Pi=0, n=1;
for (var i = 0 ; i <= loop ; i++) {
    Pi = Pi + (4 / n) - (4 / (n + 2));
    n = n + 4;
}
```

A code excerpt 2 presents an exemplary JavaScript code of the application for computing the value of Pi with a desired accuracy achieved through the number of iterations loop set by the user.

Code excerpt 2:

```
<html>
<head>
<script type="text/javascript">
function CalculatePi( )
{
    var loop = document.getElementById("loop");          Read from DOM
    var c = parseInt(loop.value);
    var f = parseFloat(loop.value);
    var Pi = 0, n = 1;
    try {
        if (isNaN(c) || f != c ) {
            throw("errInvalidNumber");
        }
        else if (c <= 0) {
            throw("errNegativeNumber");
        }
        for (var i = 0; i <= c ; i++) {
            Pi = Pi + (4 / n) - (4 / (n + 2));
            n = n + 4;
        }
        document.getElementById("PiValue").innerHTML = Pi;    Write to DOM
    }
    catch (e)                                            Error Handling
    {
        var msg = "Input Error: ";
        if (e=="errInvalidNumber")
            msg += "Invalid number.";
        else if (e=="errNegativeNumber")
            msg += "Input must be positive.";
        else
            msg += e.message;
        alert(msg);
    }
}
</script>
</head>
<body>
<label for="loop">Enter the number of cycles:</label>
<input id="loop" type="number" value="100" />
<input type="button" onclick="CalculatePi( )" value="Calculate Pi" />
<br>
<br>
<div id="PiValue">PI value appears here</div>
</body>
</html>
```

As presented in code excerpt 2, while computing the value of Pi, the JavaScript application may block the UI for the user to interact with the application. The blocking may be avoided while the CalculatePi( ) function is executed on a multi-threading platform by executing the CalculatePi( ) function in the background and/or by a different thread from the thread executing the UI. The multi-threading platform my employ, for example, a single core processor capable of multi-threading and/or a multi-core processor.

A code refactoring process such as the code refactoring process 100 may be applied to the JavaScript code of the code excerpt 2 to create a separate for computing the value of Pi in the background. This may allow the UI main code of the application to be available for interaction with the user and while the CalculatePi( ) function is executed in the background and not blocking the main code.

The code refactoring process 100 receives the JavaScript code which may be implemented through a plurality of representations, for example, code, AST, code abstraction, code XML representation and/or any software code abstraction and/or representation technique. The user (programmer) may identify the function CalculatePi( ) to execute in the background.

An analysis, for example, a static analysis is performed over the JavaScript code to create a dependency record mapping a plurality of data and/or control relationships among the code entries along the execution path of the JavaScript code.

The CalculatePi( ) function is extracted from its location in the JavaScript code to create a background process. One or more code entries which interact with a DOM are removed. The one or more code entries interacting with the DOM may include read accesses and/or write accesses. Code excerpt 3 presents the refactored CalculatePi( ) function.

Code excerpt 3:

```
function CalculatePi(loop)        Receive loop as a parameter
{
    var c = parseInt(loop.value);
    var f = parseFloat(loop.value);
    var Pi = 0, n = 1;
    if (isNaN(c) || f != c ) {
        throw("errInvalidNumber");
    }
    else if (c <= 0) {
        throw("errNegativeNumber");
    }
```

Code excerpt 3:

```
for (var i = 0; i <= c ; i++) {
    Pi = Pi + (4 / n) − (4 / (n + 2));
    n = n + 4;
}
PostMessage(Pi);            Post a message with the calculated
                            value of Pi
}
self.onmessage = function(e)   Startup code is added to the background
                               process
{
    CalculatePi(e.data.value);
}
```

As shown in the code excerpt 3, the function CalculatePi( ) now receives the parameter loop as a parameter. The code entries involving read and write accesses from/to the DOM are removed from the function CalculatePi( ). The error handling code entries are also removed from the function CalculatePi( ). The calculated value Pi is posted as a message to be available to the main code for presentation to the user. The background process may be executed by a different thread from the one or more threads executing the main code of the JavaScript application as it is an independent executable code entity which interacts with the main code through the parameter for receiving the value of loop and the message for posting the calculated value Pi. A startup code is added to the background process to associate the CalculatePi( ) with a worker in the main code. The worker is setup to execute in the background.

The code refactoring process 100 creates a handler code which includes the one or more code entries writing to the DOM as presented in the code excerpt 4 below:

Code excerpt 4:

```
worker.onmessage = function(e)
{
    document.getElementById("PiValue").innerHTML =    Write to DOM
    e.data.PiValue;
}
```

The code refactoring process 100 creates an error code for handling errors of the function CalculatePi( ) as presented in the code excerpt 5 below:

Code excerpt 5:

```
worker.onerror = function(e)
{
    var msg = "Input Error: ";
    if (e=="errInvalidNumber")
        msg += "Invalid number.";
    else if (e=="errNegativeNumber")
        msg += "Input must be positive.";
    else
        msg += e.message;
    alert(msg);
}
```

A code excerpt 6 presents a main code which includes the remaining code not included in the background code, the handler code and the error code. The handler code and the error code are integrated in the main code as presented herein.

Code excerpt 6:

```
<html>
<head>
<script type="text/javascript">
-----------Process initiation point----------------------------------------------------------
function launchPiWebWorker( )              Setup the background
process
{
    var worker = new Worker('pi.js');
    worker.onmessage = function(e)
    {
        document.getElementById("PiValue").innerHTML = e.data.PiValue;    Write to DOM
    }
    worker.onerror = function(e)
    {
        var msg = "Input Error: ";
        if (e=="errInvalidNumber")
            msg += "Invalid number.";
        else if (e=="errNegativeNumber")
            msg += "Input must be positive.";
        else
            msg += e.message;
        alert(msg);
    }
    worker.postMessage({           Initiate the background process (worker)
        'value': document.getElementById("loop").value });
}
------------------------------------------------------------------------------------------------
var loop = document.getElementById("loop");   Read from DOM
</script>
</head>
<body>
<label for="loop">Enter the number of cycles:</label>
<input id="loop" type="number" value="100" />
<input type="button" onclick="launchPiWebWorker( )" value="Calculate Pi" />
<br>
<br>
```

Code excerpt 6:

```
<div id="PiValue">PI value appears here</div>
</body>
</html>
```

As shown at the code excerpt 6 the remaining code which is essentially the main code (UI) is appended with a background process setup code to create a worker process which executes CalculatePi( ) function in the background. The setup code includes the handler code and the error code. The setup code LaunchPiWebWorker( ) is placed in the main code at a process initiation point which is identified in the main code based on the dependency record. The process initiation point follows the read access from the DOM in the execution path of the JavaScript application and precedes the write access to the DOM. For the exemplary JavaScript application, the process initiation point is identified in the execution path to be located prior to the code entry reading from the DOM: var loop=document.getElementById ("loop"). At the process initiation point, the background process is created as a worker process. The background process is initiated when the code entry worker.postMessage( ) is loaded. On initiation of the worker, the value of loop is provided to the worker as a parameter.

The result of the refactored code is that the worker performing the CalculatePi( ) computation may be executed in the background and/or by a different thread executing the main code (UI) while the main providing the UI is not blocked by the computation operations of the worker. The worker may be executed by a separate thread than the one or more threads executing the main code.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term commerce information and price is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of refactoring JavaScript code for multi-threading concurrent execution, comprising:
   using at least one hardware processor for performing the following:
      designating a source code for multi-threading execution, said source code contains at least some background code entries of a plurality of code entries indicated by a user as executed in background;
      analyzing said plurality of code entries to create a dependency record for said source code;
      creating a background process comprising said at least some background code entries by removing at least one interacting code entry which interacts with at least one document object module (DOM) from said background process, said at least one interacting code entry includes read and write code entries;
      creating a handler code comprising said write code entries;
      creating a main code comprising:
         a plurality of remaining code entries from said source code, said plurality of remaining code entries are not included in said background process and said handler code, and
         a process initiation code configured for initiating said background process by said main code at a process initiation point which is identified based on said dependency record, said process initiation point follows said read code entries in an execution path of said source code and precedes said write code entries; and
      outputting at least one refactored code file which includes said background process, said handler code and said main code.

2. The computer implemented method of claim 1, wherein said source code is a JavaScript source code.

3. The computer implemented method of claim 1, wherein said background process is executed by a different thread of at least two of a plurality of threads executing said source code, said different thread is different from a thread executing said main code.

4. The computer implemented method of claim 1, wherein said dependency record represents a plurality of relations among said plurality of code entries, each one of said plurality of relations is a member selected from a group consisting of: a data relation and a control relation.

5. The computer implemented method of claim 1, further comprising said dependency record is a dependency graph crated by a code static analysis.

6. The computer implemented method of claim 1, wherein said background process is added with at least one startup code entry.

7. The computer implemented method of claim 1, wherein said background process receives at least one missing data item as at least one parameter from said main code, said at least one missing data item is retrieved from said at least one DOM by said read code entries.

8. The computer implemented method of claim 1, wherein said background process is initiated through a message added to said main code at said process initiation point, said message includes at least one data item written to said at least one DOM by said writing code entries.

9. The computer implemented method of claim 1, wherein at least one of: said background process, handler code and main code, is extended with at least one missing control code entry to become an executable code entity in case it is not an executable code entity.

10. The computer implemented method of claim 1, further comprising extracting at least one of a plurality of error handling code entries from said background process to create an error code, said error code is extended with at least one missing control code entry to become an executable code entity in case it is not an executable code entity, wherein said error code is included in said process initiation code.

11. The computer implemented method of claim 1, further comprising creating at least one additional background process for said source code, said user indicates at least some additional background code entries associated with each of said at least one additional background process.

12. A system for refactoring JavaScript code for multi-threading concurrent execution, comprising:
   an interface for communicating with a user;
   a program store storing a code; and
   at least one processor coupled to said first interface and said program store for executing said stored code, said code comprising:
      code instructions to designate a source code for multi-threading execution, said source code contains at least some background code entries of a plurality of code entries indicated by said user as executed in background;
      code instructions to analyze said plurality of code entries to create a dependency record for said source code;
      code instructions to create a background process comprising said at least some background code entries by removing at least one interacting code entry which interacts with at least one document object module (DOM) from said background process, said at least one interacting code entry includes read and write code entries;

code instructions to create a handler code comprising said write code entries;

code instructions to create a main code comprising:
a plurality of remaining code entries from said source code, said plurality of remaining code entries are not included in said background process and said handler code, and
a process initiation code configured for initiating said background process by said main code at a process initiation point which is identified based on said dependency record, said process initiation point follows said read code entries in an execution path of said source code and precedes said write code entries; and code instructions to output at least one refactored code file which includes said background process, said handler code and said main code.

13. The system of claim 12, wherein said source code is a JavaScript source code.

14. A computer program product for refactoring JavaScript code for multi-threading concurrent execution, comprising:
a non-transitory computer readable storage medium;
first program instructions to designate a source code for multi-threading execution, said source code contains at least some background code entries of a plurality of code entries indicated by a user as executed in background;
second program instructions to analyze said plurality of code entries to create a dependency record for said source code;
third program instructions to create a background process comprising said at least some background code entries by removing at least one interacting code entry which interacts with at least one document object module (DOM) from said background process, said at least one interacting code entry includes read and write code entries;
fourth program instructions to create a handler code comprising said write code entries;
fifth program instructions to create a main code comprising:
a plurality of remaining code entries from said source code, said plurality of remaining code entries are not included in said background process and said handler code, and
a process initiation code configured for initiating said background process by said main code at a process initiation point which is identified based on said dependency record, said process initiation point follows said read code entries in an execution path of said source code and precedes said write code entries; and sixth program instructions to output at least one refactored code file which includes said background process, said handler code and said main code;
wherein said first, second, third, fourth, fifth and sixth program instructions are executed by at least one processor from said non-transitory computer readable storage medium.

15. The computer program product of claim 14, wherein said source code is a JavaScript source code.

16. The computer program product of claim 14, wherein said background process is added with at least one startup code entry.

17. The computer program product of claim 14, wherein said background process receives at least one missing data item as at least one parameter from said main code, said at least one missing data item is retrieved from said at least one DOM by said read code entries, and
said background process is initiated through a message added to said main code at said process initiation point, said message includes at least one data item written to said at least one DOM by said writing code entries.

18. The computer program product of claim 14, wherein at least one of: said background process, handler code and main code, is extended with at least one missing control code entry to become an executable code entity in case it is not an executable code entity.

19. The computer program product of claim 14, further comprising extracting at least one of a plurality of error handling code entries from said background process to create an error code, said error code is included in said process initiation code;
wherein said error code is extended with at least one missing control code entry to become an executable code entity in case it is not an executable code entity.

20. The computer program product of claim 14, further comprising creating at least one additional background process for said source code, said user indicates at least some additional background code entries associated with each of said at least one additional background process.

* * * * *